July 7, 1931.  J. W. MYERS ET AL  1,813,635
AUTOMATIC IRIS FOR CAMERAS
Filed March 27, 1930  2 Sheets-Sheet 1
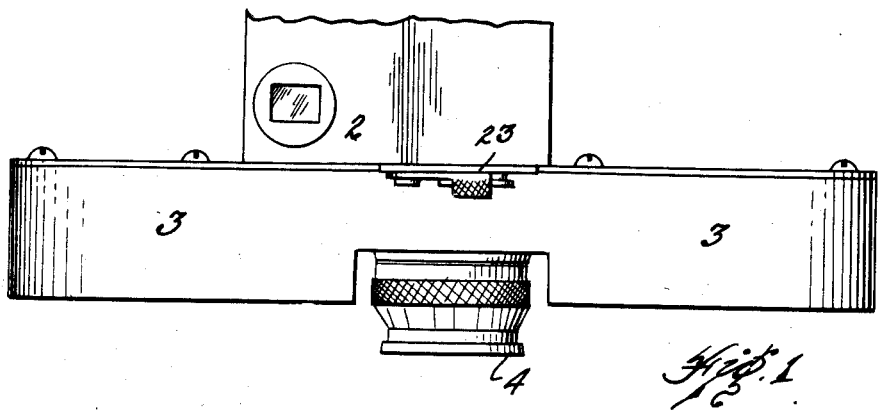
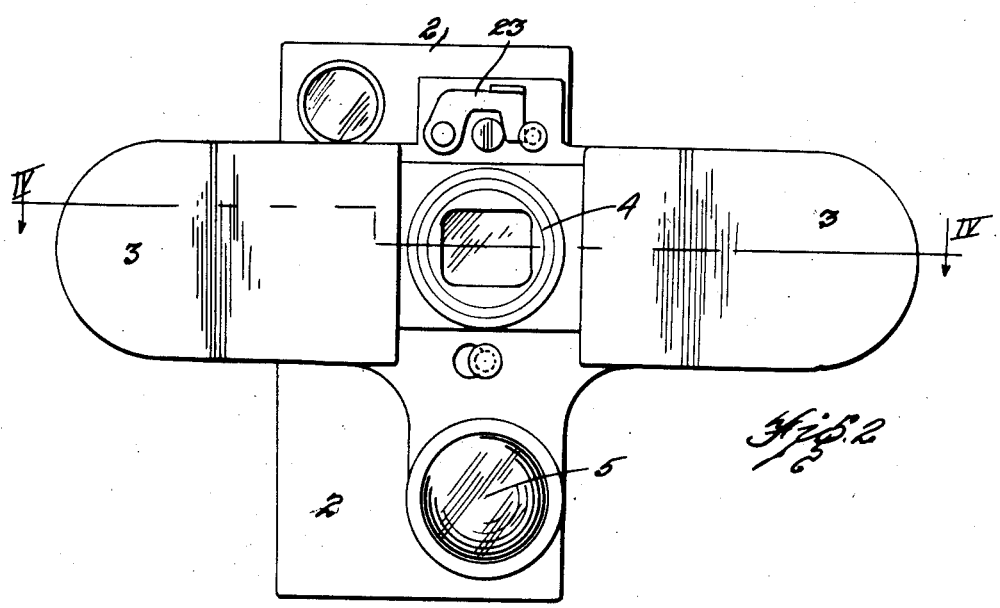
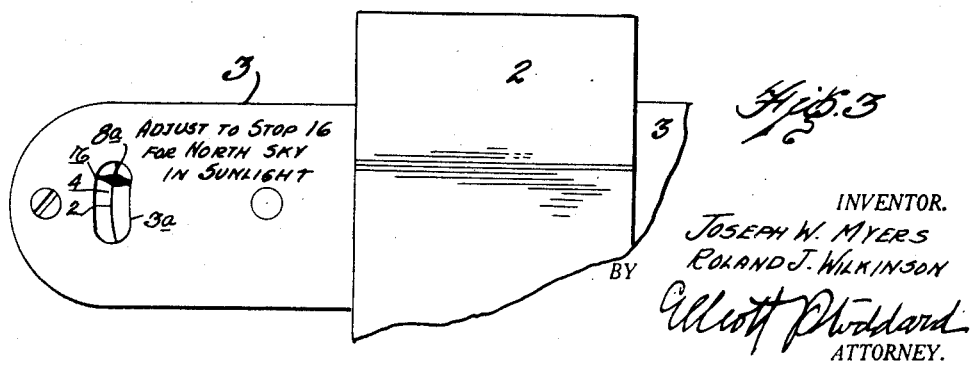
INVENTOR.
JOSEPH W. MYERS
ROLAND J. WILKINSON
BY
ATTORNEY.

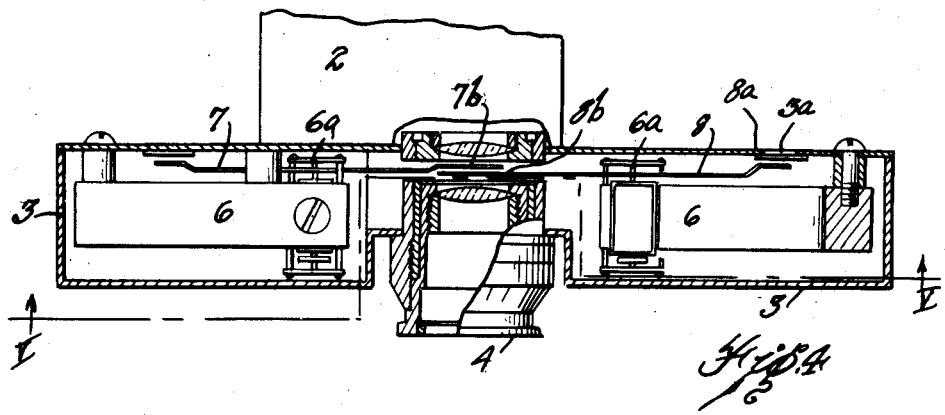
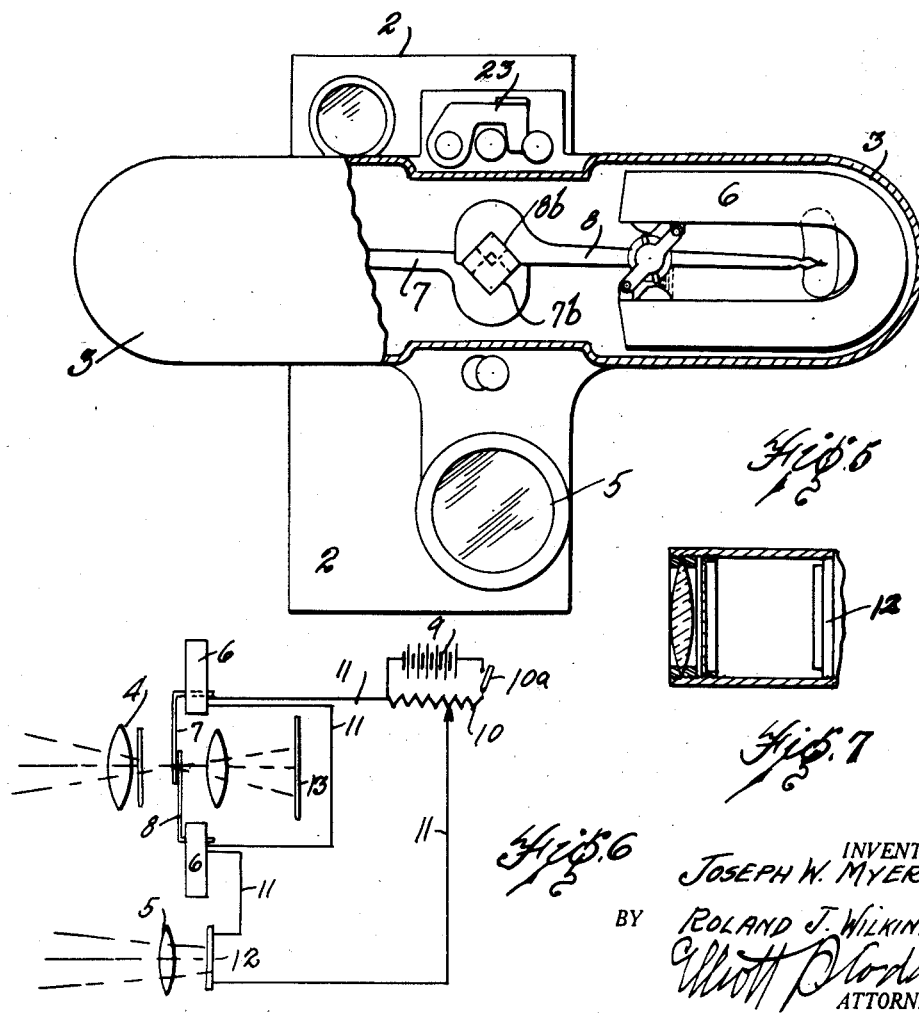

Patented July 7, 1931

1,813,635

UNITED STATES PATENT OFFICE

JOSEPH W. MYERS AND ROLAND J. WILKINSON, OF JACKSON, MICHIGAN

AUTOMATIC IRIS FOR CAMERAS

Application filed March 27, 1930. Serial No. 439,478.

Our invention relates to an automatic iris for cameras and an object of our improvements is to provide means for automatically adjusting the light aperture so that the image upon the film shall have a constant intensity, even when the light upon the object being photographed is varying. We accomplish this object in the apparatus shown in the accompanying drawing, in which:

Figure 1 is a plan view of an apparatus embodying our invention and so much of a camera as is necessary to illustrate its connection therewith.

Figure 2 is a front view of the same.

Figure 3 is an elevation of the right hand portion of Figure 1, the apparatus being turned around so that what is in the back in Figure 1 is brought to the front so that it may be seen by the observer.

Figure 4 is a section on the line IV, IV, Figure 2.

Figure 5 is a section on the line V, V, Figure 4.

Figure 6 is a diagrammatic view illustrating the operation of the device.

Figure 7 is a partial side view of the apparatus. The tube 5 being shown in section.

2 is a camera. 3 is a casing secured by an attaching device 23 to the camera 2. In the casing 3 is the lens-tube 4 for the camera and below and parallel to this a second tube 5 having a lens therein.

6, 6 are apparatus of the D'Arsonval galvanometer type adapted to rotate shafts 6a, 6a an angular distance that is a function of the current of electricity passing through them. An apparatus 6 is located within the casing 3 at each end thereof and has an arm 7 or 8 secured upon its shaft 6a. The arm 8 has at its end, remote from the lens-tube 4, a pointer 8a. 3a is a slot having a graduated scale, as shown in Figure 3, through which the pointer 8a may be observed.

The arms 7 and 8 extend toward each other, their adjacent ends being parallel and overlapping and at these adjacent ends, provided with notches 7b and 8b that coact with each other to define the aperture for the light through the lens-tube. I have shown these slots as having their walls at right angles to each other and together forming a square opening, as shown in Figure 5, which has its area varied but retains its shape when the arms 7 and 8 have their adjacent ends moved relative to each other. 12 is a light-sensitive cell located at the inner end of the tube 5 in position to receive the light passing through the lens in said tube.

Referring to the diagram of Figure 6, 9 is a source of electricity and 11 indicates a circuit through the apparatus 6, 6 and the selenium cell 12. 10 is a construction for regulating the current in the circuit 11. This may have a switch 10a breaking the circuit. 13 is the film upon which the image is formed.

The operation of the above described device is as follows:

The camera being directed on the object to be photographed, the light from said object passes equally into the tubes 4 and 5. The light passing into the tube 5 acts upon the light-sensitive cell 12 so that the current passing through the circuit 11 and the apparatus 6, 6 will be regulated thereby to vary the angles of the arms 7 and 8 and thus regulate the openings between the notches 7b and 8b to compensate for any variation in the light from the object being photographed. As this light varies the current will vary accordingly and the light aperture will be thereby adjusted to the light so as to maintain a constant intensity of image upon the film 10.

A filter may be used, if required, to adjust the sensitiveness of the light-sensitive cell to the requirement of the apparatus.

To adjust the apparatus shown so that it will function as intended it is necessary to train the cell on a light of known intensity and then by means of the potentiometer 10 to regulate the current through the motors so that the diaphragm opening is proper for this known intensity. The known intensity may be north sky light which is fairly constant or it may be a flash light bulb operating at known brilliancy or any other reasonably fixed source. The diaphragm opening existing at any time may be readily observed through the small window 3a in the apparatus shown, behind which a pointer 8a motivated from one of the motors operating the diaphragm is placed.

The lenses are arranged so that substantially the same image is formed at 12 and 13.

The apparatus 6, 6 are designed so that they shall actuate the arms 7 and 8 to always produce the correct light opening, except that the aperture is never quite closed and the pole pieces of the field magneto are formed by trial to secure this result as illustrated in Figure 8.

What we claim is:

1. The combination of an apparatus adapted to vary the area of the light aperture, an electrically actuated means for operating said apparatus and a light sensitive means adapted to vary the current in said electrically actuated means for the purpose described.

2. The combination of an apparatus adapted to vary the area of the light aperture, an electrically actuated means for operating said apparatus and a light sensitive means adapted to vary the current in said electrically actuated means for the purpose described, said light sensitive means being so located that it is exposed to light of the same intensity as that passing to the objective aperture.

3. The combination of an apparatus adapted to vary the area of the light aperture and an electric motor having specially formed pole pieces, for actuating said apparatus whereby said apparatus varies the area of the light aperture to adapt it to the intensity of the light being received.

4. The combination of an adjustable apparatus adapted to vary the area of the light aperture, an electrically actuated means for operating said apparatus and a light sensitive means adapted to vary the current in said electrically actuated means for the purpose described and an indicator showing the area of the opening at any time.

5. The combination of an adjustable apparatus adapted to vary the area of the light aperture, an electrically actuated means for operating said apparatus and a light sensitive means adapted to vary the current in said electrically actuated means for the purpose described and means for adjusting the current through said electrically actuated means at will so that it shall vary within limits required by the use.

6. The combination of an adjustable apparatus adapted to vary the area of the light aperture, a D'Arsonval type of motor for actuating said apparatus and a light-sensitive means adapted to vary the current through said motor for the purpose described.

7. The combination of two movable arms adapted to vary the area of the light aperture by their relative movement, a D'Arsonval type motor for each of said arms and a light-sensitive means adapted to vary the current through said motor for the purpose described.

8. The combination of an apparatus adapted to vary the area of the light aperture, an electrically actuated means for operating said apparatus and a light sensitive means adapted to vary the current in said electrically actuated means for the purpose described, the same forming a unit adapted to be attached or removed from the camera as a whole.

9. The combination of apparatus for varying the intensity of the image, a light sensitive means adapted to actuate said apparatus for the purpose described and means for causing the light from the field of view taken in by the objective to also fall on the light sensitive portion of said actuating means and to limit the same to that field of view.

In testimony whereof, we sign this specification.

JOSEPH W. MYERS.
ROLAND J. WILKINSON.